United States Patent [19]
Slade et al.

[11] Patent Number: 5,615,069
[45] Date of Patent: Mar. 25, 1997

[54] THIN-FILM TRANSDUCER DESIGN FOR UNDERSHOOT REDUCTION

[75] Inventors: Steven B. Slade, New Hope; Brian S. Zak, Excelsior; Nathan Curland, St. Louis Park, all of Minn.

[73] Assignee: Seagate Technology, Inc., Scotts Valley, Calif.

[21] Appl. No.: 481,090

[22] Filed: Jun. 7, 1995

[51] Int. Cl.⁶ .......................... G11B 5/147; G11B 5/187
[52] U.S. Cl. .......................................... 360/126; 360/122
[58] Field of Search .................................. 360/119, 122, 360/125–126

[56] References Cited

U.S. PATENT DOCUMENTS

| | | | |
|---|---|---|---|
| 4,951,166 | 8/1990 | Schewe | 360/119 |
| 4,970,615 | 11/1990 | Gau | 360/122 |
| 4,970,616 | 11/1990 | Ramaswamy | 360/122 |
| 5,040,087 | 8/1991 | Lee | 360/121 |
| 5,137,750 | 8/1992 | Amin et al. | 360/119 X |
| 5,181,152 | 1/1993 | Yan et al. | 360/122 X |
| 5,267,112 | 11/1993 | Batra et al. | 360/119 |
| 5,285,340 | 2/1994 | Ju et al. | 360/119 |
| 5,296,979 | 3/1994 | Kawabe et al. | 360/119 |
| 5,398,145 | 3/1995 | Jeffers et al. | 360/119 X |
| 5,452,166 | 9/1995 | Aylwin et al. | 360/122 X |

FOREIGN PATENT DOCUMENTS

| | | |
|---|---|---|
| 0146410A2 | 6/1985 | European Pat. Off. . |
| 0437147A2 | 7/1991 | European Pat. Off. . |
| 2687497 | 8/1993 | France . |
| 58-080119 | 5/1983 | Japan . |
| 59-213012A | 12/1984 | Japan . |
| 1-133211A | 5/1989 | Japan . |

OTHER PUBLICATIONS

M. Yoshida et al., Edge Eliminated Head, IEEE Transactions on Magnetics, vol. 29, No. 6, Nov. 1993, pp. 3837–3839.
K. Fukuda et al., Off–track Capability of a Pole Trimmed Thin Film Head, Journal of the Magnetics Society of Japan, vol. 18, Supplement, No. S1 (1994) pp.
T. Howell et al., Advanced Read Channels for Magnetic Disk Drives, IEEE Transactions on Magnetics, vol. 30, No. 6, Nov. 1994, pp. 3807–3812.

*Primary Examiner*—John H. Wolff
*Attorney, Agent, or Firm*—Kinney & Lange

[57] ABSTRACT

A thin-film head electromagnetic transducer has two pole pieces which define a gap. The surface of at least one of the pole pieces has a linear edge defining one side of the gap and has two linear edges which are at an acute angle to the linear edge defining the gap and are symmetric about and abut at an axis perpendicular to the linear edge defining the gap.

17 Claims, 11 Drawing Sheets

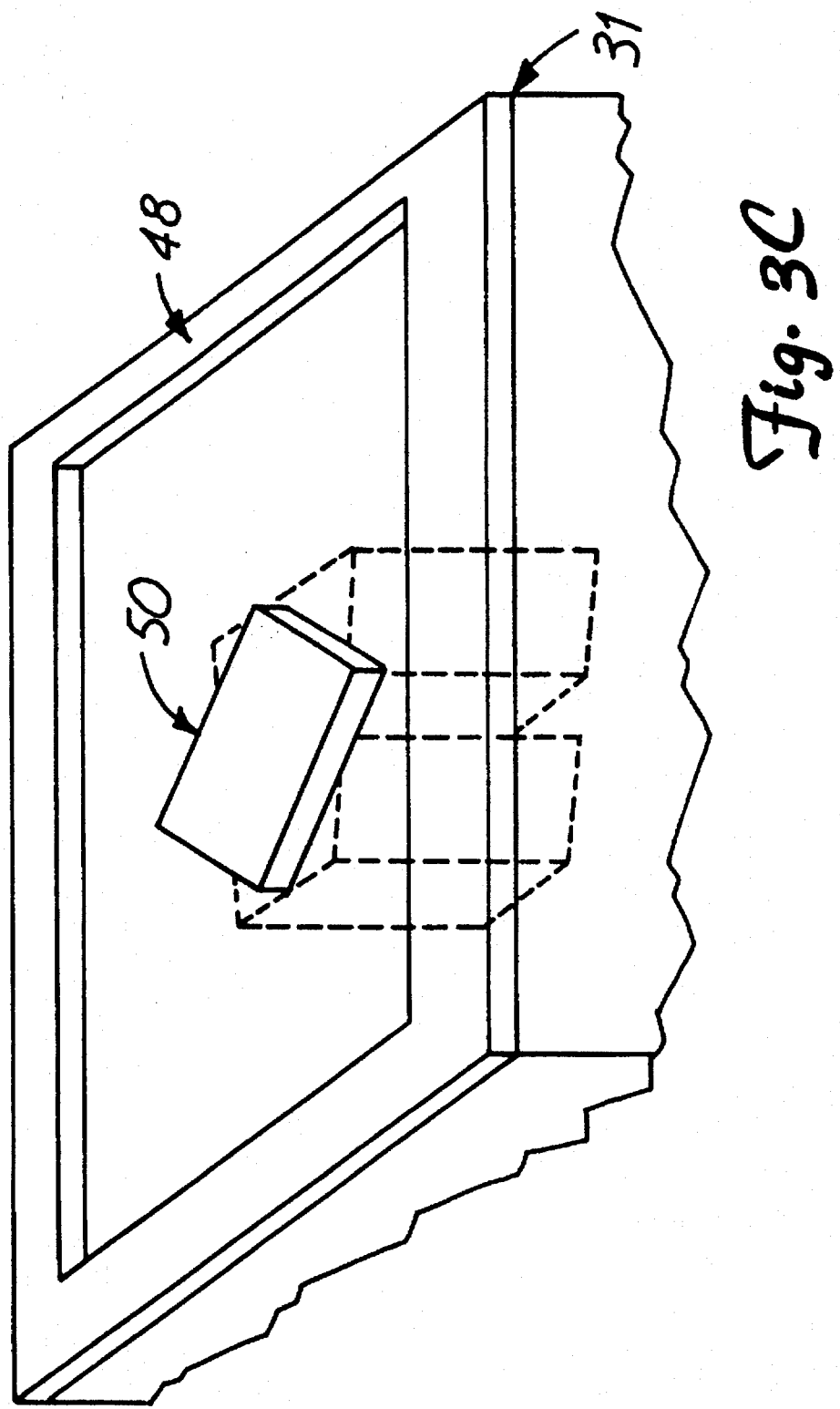

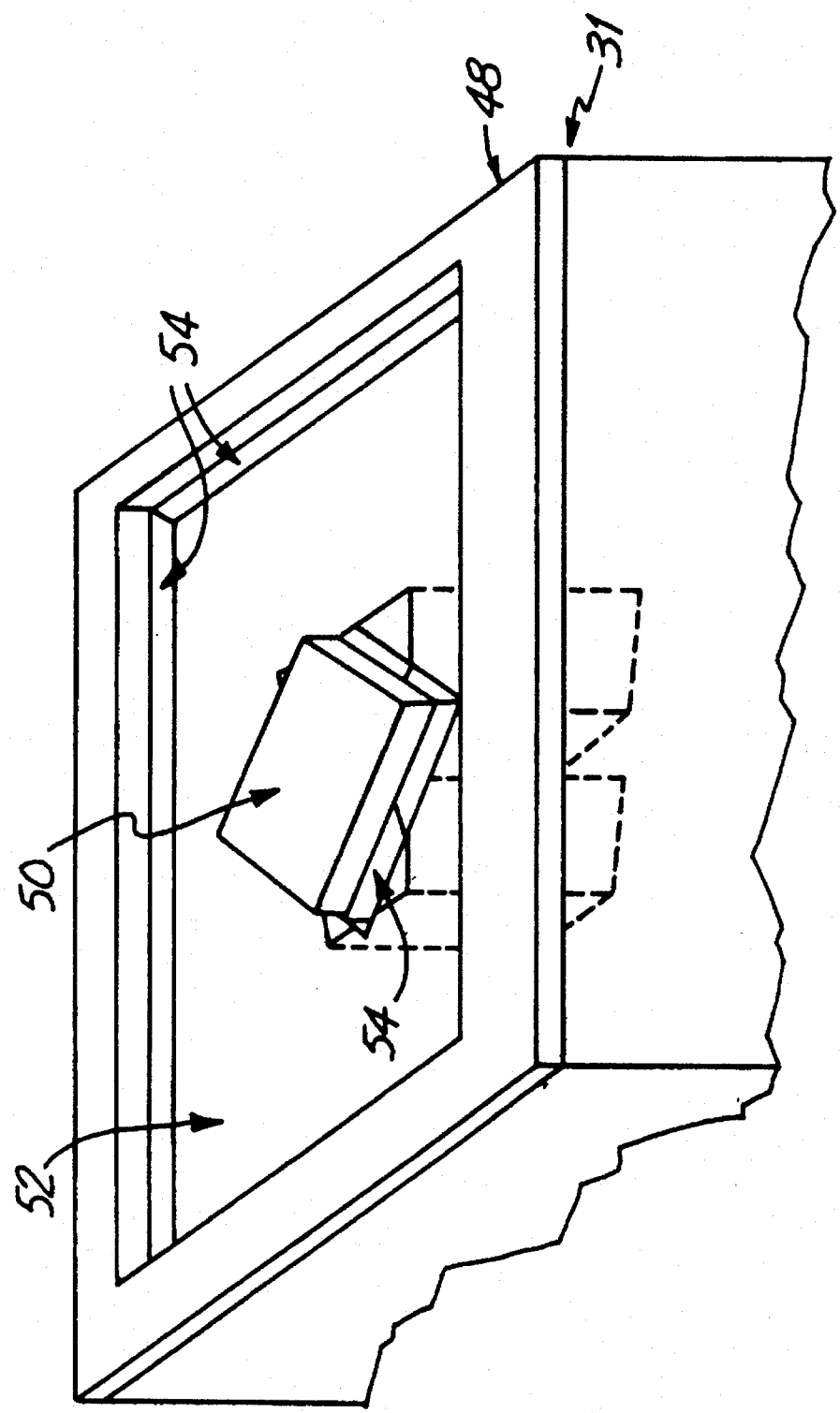

THIN-FILM TRANSDUCER DESIGN FOR UNDERSHOOT REDUCTION

BACKGROUND OF THE INVENTION

The present invention relates to shaped magnetic poles for thin-film magnetic heads. More particularly, it relates to shaped magnetic poles which reduce undershoot in the information retrieval signal.

In magnetic recording devices, thin-film magnetic heads retrieve ("read") and store ("write") information to magnetic media by magneto-resistively or inductively sensing the magnetization of and creating respectively, localized magnetic domains in the media. When reading information from a magnetic medium, a thin-film head's interface surface moves over the medium at a short distance from the medium so that magnetic flux from the localized domains enters permeable material pole tips in the interface surface. This flux extends over a selected permeable material path from the surface of the pole tips at the interface surface to an electromagnetic transducer which converts the magnetic flux in the path into an electric read current. The electric read current is used by the recording device in which the head is mounted to create an electric read signal.

As the thin-film head approaches a new magnetic domain, flux from that domain extends through the leading edge of the closer of the two pole tips, creating a small magnitude pulse in the read signal. When the thin-film head crosses fully over the new domain, flux from that domain extends through both pole tips and over the permeable material path producing a large magnitude pulse in the read signal of opposite polarity to that of the first pulse. As the magnetic head exits the domain, a small amount of flux from that domain extends through the trailing edge of the last pole tip and creates a small magnitude pulse in the read signal of the same polarity as the first small pulse.

The large magnitude pulse is intermediate in time over the time it takes the head to cross over the domain and is the primary pulse in the read signal. The series of primary pulses in the read signal produced by the thin-film head as it moves over the series of magnetic domains in the medium is translated into binary data by decoding circuitry in the magnetic recording device. Ideally, the primary pulses obtained from each domain are large in magnitude so that they are easily detected by the decoding circuitry and narrow in width, i.e. short in time with respect to the domain crossing time, so that they do not interfere with one another. The two smaller pulses on either side of the primary pulse in time are termed "undershoots". Undershoots in the read signal are undesirable because they may overlap in time, i.e. "interfere", with primary pulses created by other magnetic domains. This interference, known as intersymbol interference, indirectly reduces the lineal density of the domains in the magnetic media because the linearly sequential domains must be positioned far enough apart so that undershoots from one domain do not interfere with the primary pulse of another domain in such a way that the primary pulses become undetectable.

The magnitude of undershoots in the read signal is affected by the geometry of the pole tips and specifically by the location and position of the edges of the pole tips. To remove undershoots, several methods have been developed which change the location and position of these edges. These methods mill away the edges of existing pole tips to create new pole tip shapes. Examples of these new pole tip shapes can be found in Ramaswamy, RECORDING HEAD TO MINIMIZE UNDERSHOOTS IN READBACK PULSES, U.S. Pat. No. 4,970,616, Issued Nov. 13, 1990; Howell, T. D. et al. "Advanced Read Channels for Magnetic Disk Drives", IEEE Transactions on Magnetics, vol. 30, no. 6 (November 1994), pp. 3807–3812; and Yoshida, M. "Edge Eliminated Head", IEEE Transactions on Magnetics, vol. 29, no. 6 (November 1993), pp. 3837–3839. Although these new pole tip shapes change the location and position of the pole tip edges, the pole tip shapes found in these references have manufacturing or performance characteristics which make them less than optimum for reducing undershoots in the read signal.

SUMMARY OF THE INVENTION

The present invention is a thin-film head electromagnetic transducer which has a pair of pole tips that define a gap between them. The surface of at least one of these pole tips has a linear edge that defines one side of the gap and two other linear edges which are identical to each other and which are symmetric about and abut at an axis perpendicular to the gap-defining linear edge. The pole tips receive magnetic flux from magnetic fields stored on a medium and direct the magnetic flux along a path to an area of the thin-film head where it is transduced into an electrical signal.

The pole tips of the present invention reduce the magnitude of leading and trailing undershoots by eliminating leading and trailing edges of the pole tips which are perpendicular to the direction the head travels over the medium or parallel to the gap-defining edges of the pole tips. In addition, because the present invention's pole tips have a symmetrical shape, the invention minimizes undershoot variations caused by variations in the skew angle of the thin-film head. This means that the present invention maximizes the reduction of the magnitude of undershoots at all locations over the medium.

In preferred embodiments, the pole tips are shaped after the thin-film head has been cut into rows and cut away from a wafer containing a number of thin-film heads. The pole tips are shaped by masking a pattern over the pole tips' surfaces and removing head material around the mask. The shapes of the mask are chosen so that errors in aligning the mask with the pole tips do not result in narrower read gaps after the material outside of the mask is removed.

BRIEF DESCRIPTION OF THE DRAWINGS

FIG. 3C is an isometric view of the partially constructed thin-film head with portions of the photoresist removed;

FIG. 3D is an isometric view of the partially constructed thin-film head after unmasked material has been removed;

DETAILED DESCRIPTION OF THE PREFERRED EMBODIMENTS

Figure 1:
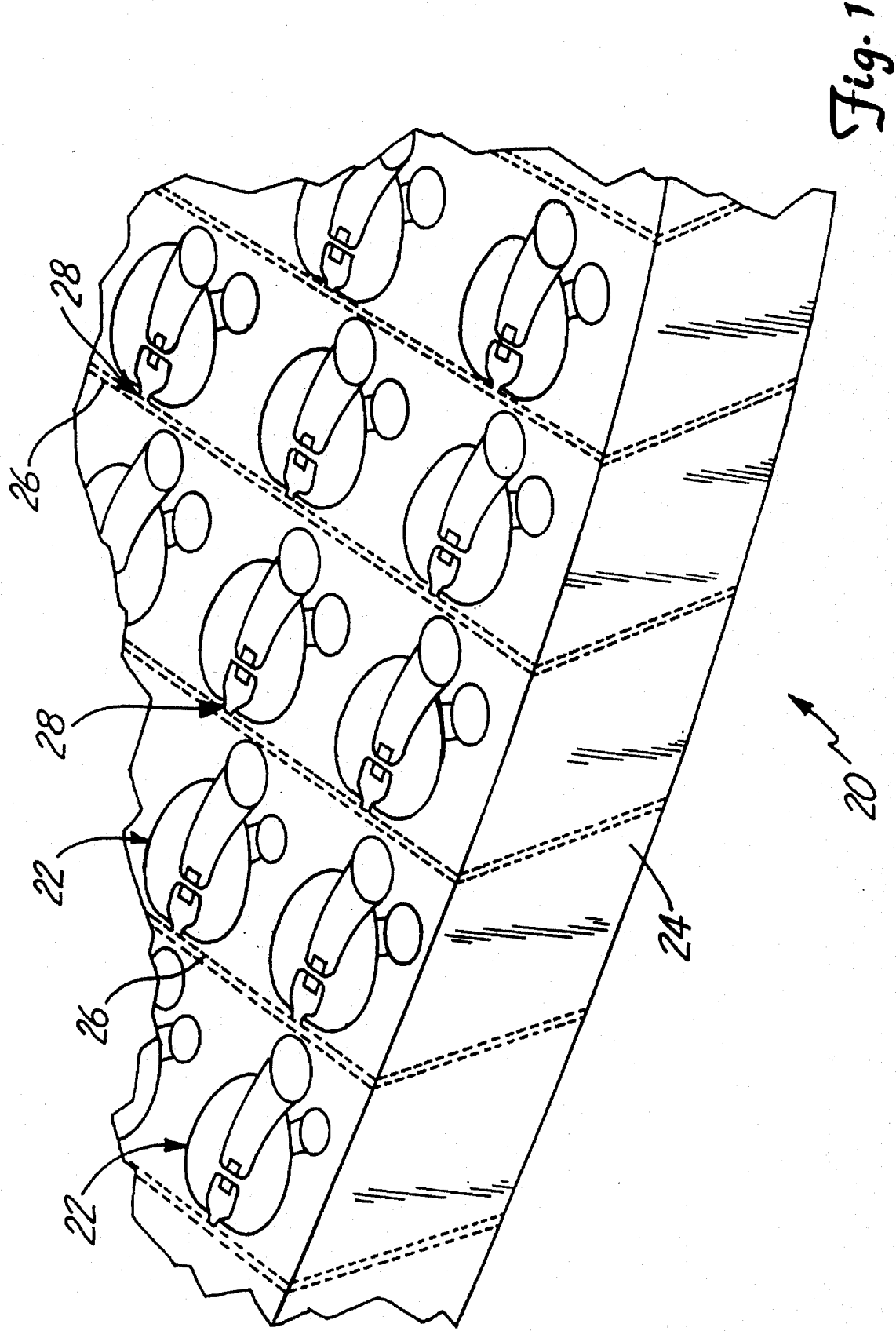
FIG. 1 is a portion of a wafer of partially constructed thin-film heads.

FIG. 1 is a portion of a wafer 20 containing a plurality of partially constructed inductive thin-film heads 22 formed through appropriate material depositions and etchings on a substrate 24 in a well known manner. To avoid obscuring the view of the remainder of the heads, FIG. 1 does not show a final insulation layer which lies over the top of thin-film heads 22. Thin-film heads 22 are constructed in rows and are cut from wafer 20 along cut lines 26 which intersect top pole tips 28 and bottom pole tips 30 (not shown).

Figure 2:
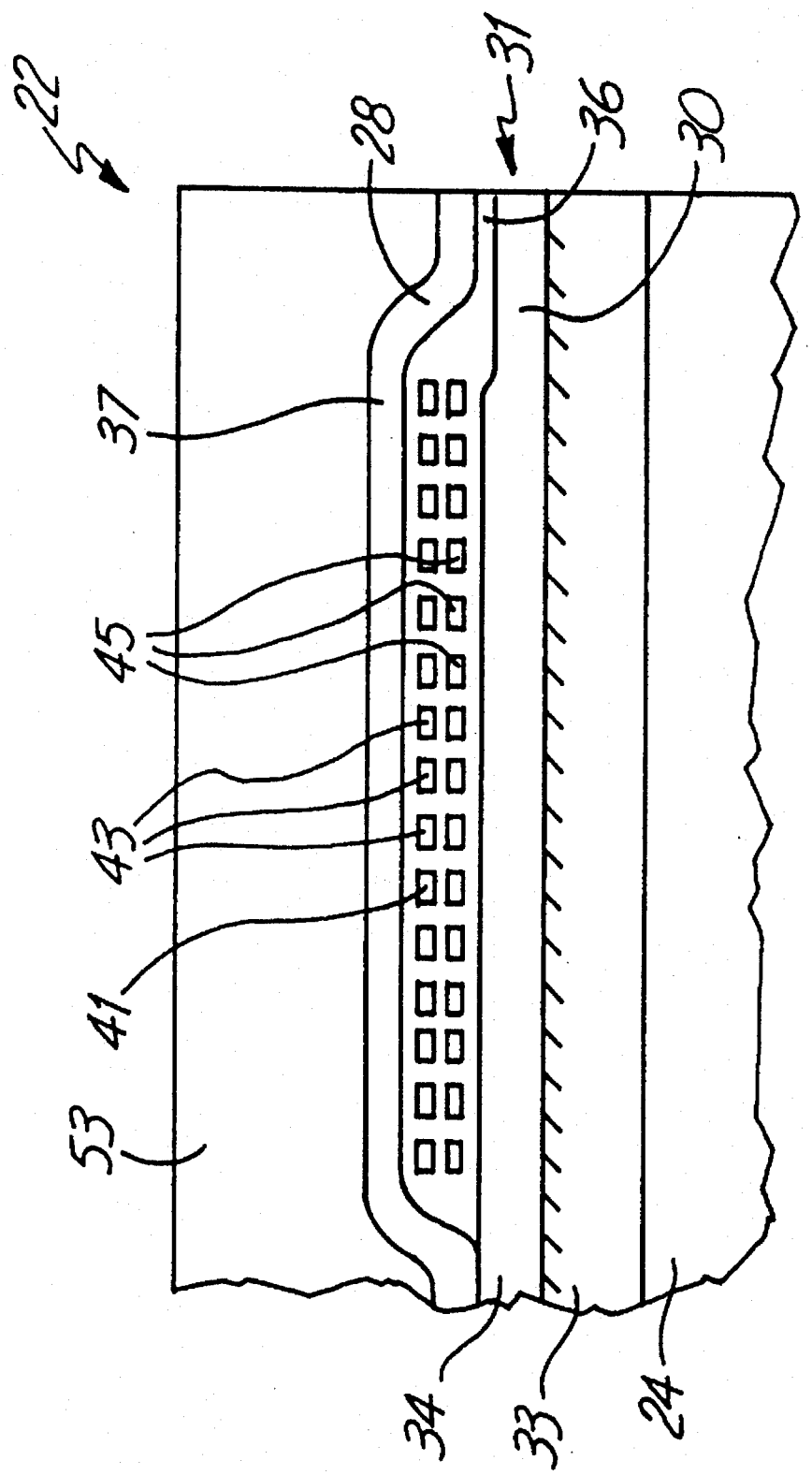
FIG. 2 is a cross-sectional side view of an inductive partially constructed thin-film head broken off the wafer of FIG. 1.

FIG. 2 is a cross-sectional side view of an inductive thin-film head 22 broken away from wafer 20. Working surface 31 shown on the right side of thin-film inductive head 22, is the surface produced by cut lines 26 of FIG. 1. Thin-film head 22 is constructed in wafer 20 by depositing and etching layers of material onto substrate 24. In general, a bottom insulating layer 33 of nonmagnetic material such as $Al_2O_3$ is first deposited on substrate 24. A bottom core leg 34 forming a bottom pole tip 30 near working surface 31 is deposited on top of bottom insulating layer 33. A top core leg 37 is formed above bottom core leg 34 and forms top pole tip 28 near working surface 31. The two core legs are typically constructed out of a nickel-iron alloy chosen for its magnetic properties. Between top core leg 37 and bottom core leg 34 is an insulating material 41 which houses conductive coils 43 and 45. Top pole tip 28 and bottom pole tip 30 form a gap 36 between them which is typically filled with a nonmagnetic material such as $Al_2O_3$. Above top core leg 37 is top insulating layer 53 which is also preferably $Al_2O_3$. Cut line 26 cuts through top insulating layer 53, top pole tip 28, gap 36, bottom pole tip 30 and bottom insulating layer 33 to form working surface 31 which is perpendicular to the plane of substrate 24.

Figure 3A:
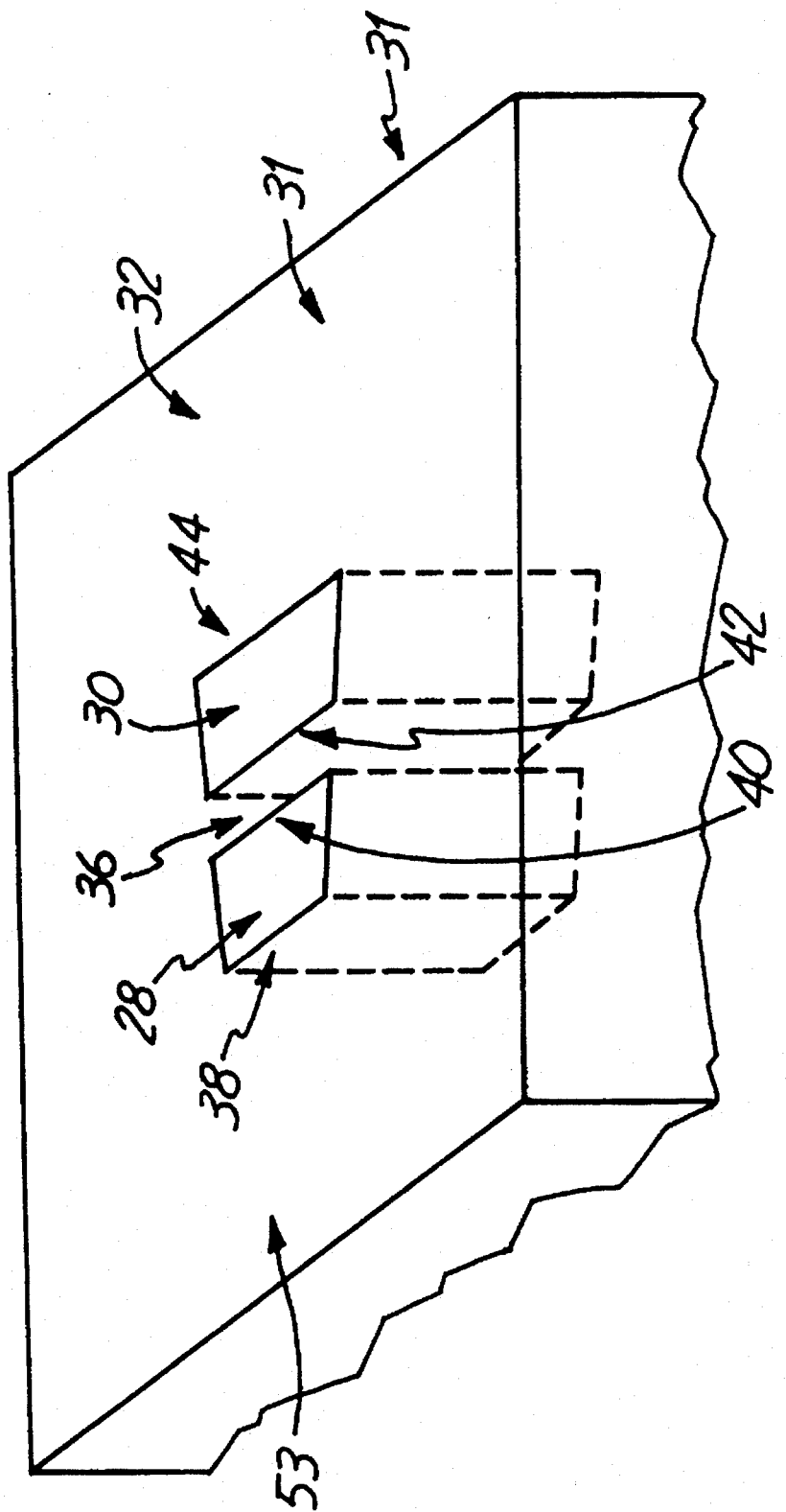
FIG. 3A is an isometric view of the working surface of the partially constructed thin-film head of FIG. 2.

FIG. 3A is an isometric view of working surface 31 for one partially constructed thin-film head created by cutting wafer 20 along cut lines 26. Cut line 26 exposes working surface 31 which includes top insulating layer 53, bottom insulating layer 33, gap 36 and the surfaces of top pole tip 28 and bottom pole tip 30. Top insulating layer 53 and bottom insulating layer 33 form a surrounding material 32 which is an integral unit of insulating material that surrounds the pole tips. The remainder of the pole tips which are below surface 31 and which provide part of the permeable material path to the electromagnetic transducer are shown in dashed line form in FIG. 3A. The depositions and etchings done in forming water 20 created the trapezoidal cross-sectional shape of top pole tip 28 and bottom pole tip 30. Top pole tip 28 has leading edge 38 and gap-defining edge 40 and bottom pole tip 30 has gap-defining edge 42 and trailing edge 44. These edges are generally parallel to each other and when the head is placed in a magnetic recording device, these edges are generally perpendicular to the head's direction of movement over the magnetic medium. The head is positioned in the recording device so that leading edge 38 crosses over the magnetic medium ahead of gap 36 and trailing edge 44.

In heads without reshaped pole tips, leading edge 38 and trailing edge 44 are responsible for a large amount of the undershoot found in the read signal. Just before gap 36 passes over a domain, flux from the domain extends through leading edge 38 creating a leading undershoot. Just after gap 36 passes out of the domain, flux from the domain extends through trailing edge 44 creating a trailing undershoot. The amount of flux that extends through the edges at a given time is dependent upon the degree to which the pole tip edges are perpendicular to the head's direction of travel over the magnetic medium, the degree to which the pole tip edges are parallel to the gap-defining edges and the distance from the pole tip edges to the surface of the magnetic medium. As discussed below, the present invention replaces leading edge 38 and trailing edge 44 with a leading and trailing edge that are further from the surface of the medium and with tapered edges which give rise to less flux change per unit time than do leading edge 38 and trailing edge 44.

Figure 3B:
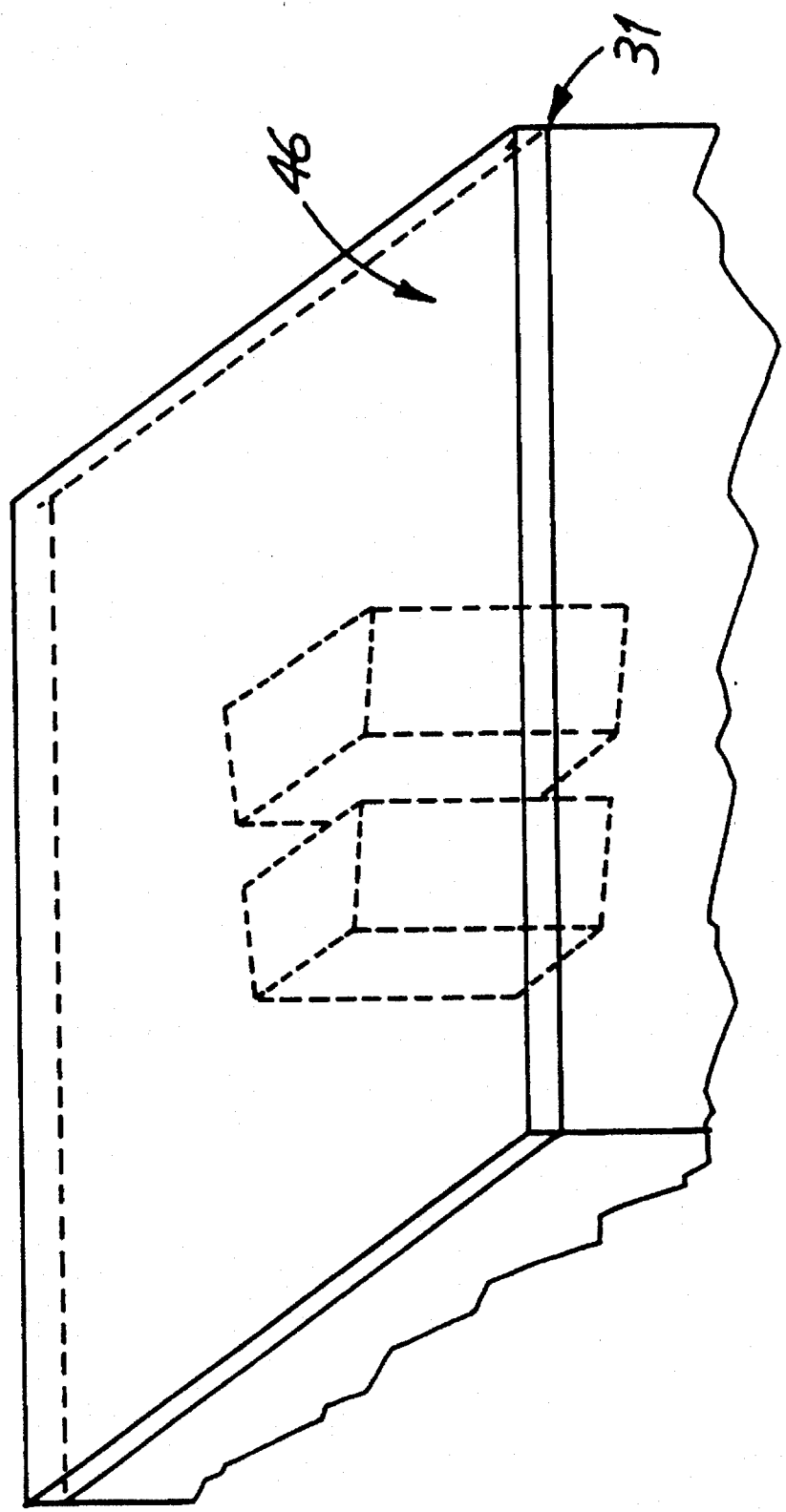
FIG. 3B is an isometric view of the partially constructed thin-film head with a film of photoresist applied to the working surface.

The pole tip shaping process begins by using a well known process to deposit a thin film of photoresist 46 over the entirety of working surface 31, as shown in FIG. 3B. Photoresist 46 can be one of many well known materials sensitive to electromagnetic radiation of certain wavelengths whose bonding characteristics change when exposed to such radiation. Photoresist 46 is exposed to a pattern of such radiation by passing the radiation through a photomask which spatially filters the radiation, allowing radiation to impinge only certain areas of photoresist 46. Those selected portions of photoresist 46 impinged upon by the radiation are altered with respect to those portions which are not impinged upon. This alteration results in areas on working surface 31 where photoresist 46 is tightly bound to the surface and areas where photoresist 46 is lightly bound to the surface. Additional well known processing steps remove the lightly bound resist and harden the tightly bound resist, forming a pattern of hardened resist. Such a pattern is shown in FIG. 3C where a photoresist border frame 48 and a photoresist pole tip mask 50 are the only portions of photoresist 46 left after the photoresist is developed.

The pole tip reshaping process continues with the removal of head material near working surface 31 not covered by border frame 48 or pole tip mask 50. This material may be removed to a selected depth through chemical etching or ion milling, both well known methods for removing material from thin-film heads. As shown in FIG. 3D, the removal of this material creates a depression 52 which is preferably 0.05 to 0.5 µm. deep. Between depression 52 and border frame 48 and pole tip mask 50 are canted walls 54. Canted walls 54 are a result of limitations in the material removal process.

When the material removal process is completed, photoresist 46 is removed from the masked areas through a mechanical process which fractures the brittle photoresist causing it to release from the surface beneath it. Once border frame 48 and pole tip mask 50 are removed, the process of patterning the pole tips is complete. An isometric view of the completed interface surface with reshaped pole tips of one preferred embodiment is shown in FIG. 3E.

Figure 3E:
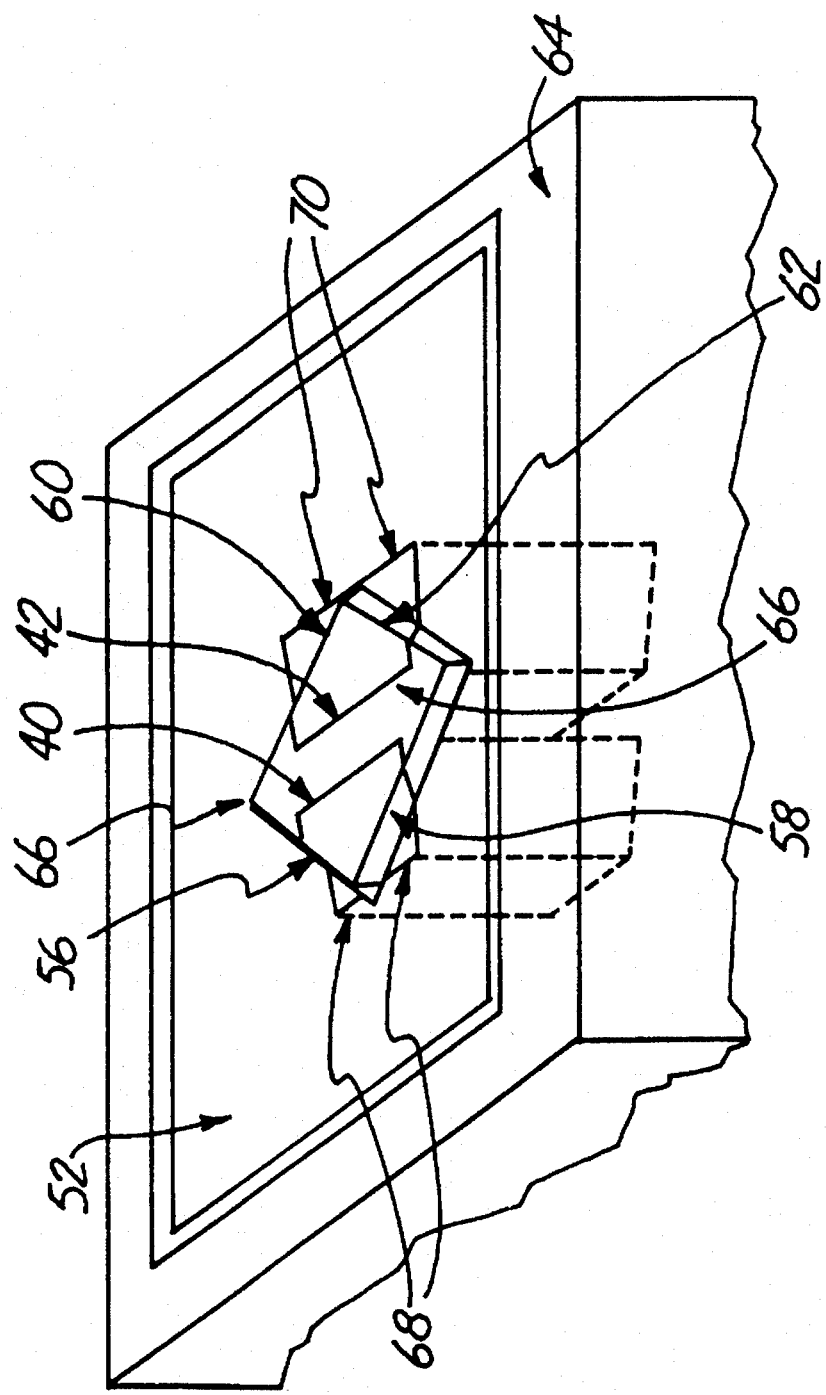
FIG. 3E is an isometric view of the partially constructed thin-film head after photoresist on the masked portions has been removed.

In FIG. 3E, the material removal process used to form the interface surface has left a raised border 64, a raised inner surface 66 and depression 52. It has also removed leading edge 38 and trailing edge 44 leaving depressed leading edge 68 and depressed trailing edge 70 which are some distance, typically 0.05 to 0.5 µm, from the plane of raised inner surface 66. By replacing leading edge 38 and trailing edge 44 with depressed leading edge 68 and depressed trailing edge 70, the present invention increases the distance between these edges and the magnetic medium, reducing the amount of flux arising at these edges and thus reducing the amount of undershoot produced by these edges.

In addition, the present invention produces tapered edges 56, 58, 60, and 62 which are not perpendicular to the thin-film head's direction of travel over the medium and are not parallel to gap-defining edges 40 and 42. These tapered edges reduce undershoots by spreading out over time the flux which extends through these edges. Instead of having a large amount of flux extending through the leading or trailing edge of the pole tip at one time, the present invention has small amounts of flux extending through the tapered edges over a longer time. This spreads out the undershoot making it last longer at a smaller magnitude.

Figure 4:
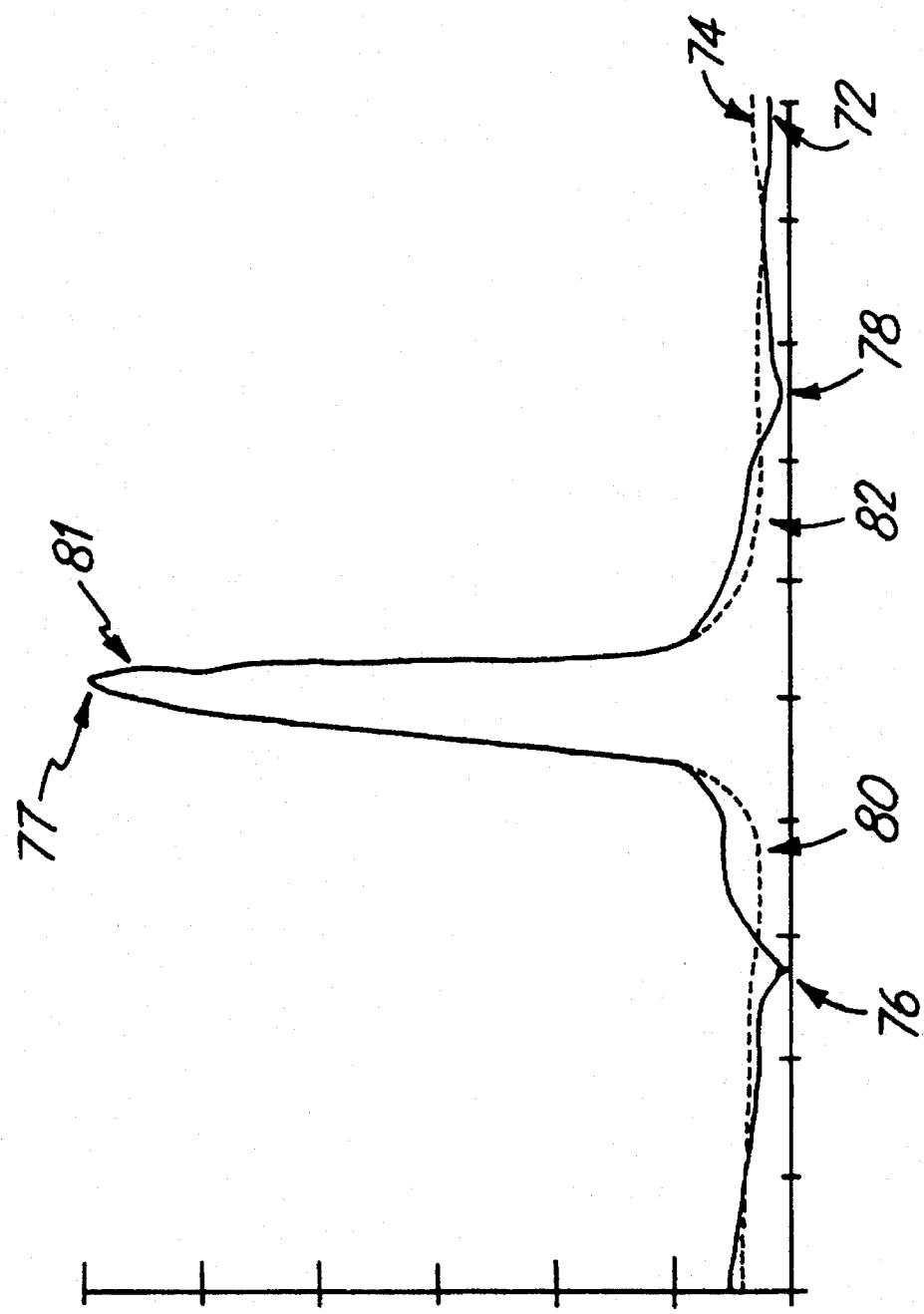
FIG. 4 is a graph of read signals from a prior art head and a patterned pole head of the present invention.

FIG. 4 shows read signals for a thin-film head without reshaped pole tips, such as the prior art head shown in FIG. 3A, and a head of the present invention with reshaped pole tips, such as the one shown in FIG. 3E. The read signals are created by passing the heads over a magnetic transition between two domains. Non-reshaped head signal 72 is the read signal produced by the head without reshaped pole tips and reshaped head signal 74 is the read signal from the head with reshaped pole tips of the present invention. Non-reshaped head signal 72 has leading undershoot 76, primary pulse 77 and trailing undershoot 78. Reshaped head signal 74 has leading undershoot 80, primary pulse 81 and trailing undershoot 82. Leading undershoot 76 and trailing undershoot 78 of non-reshaped head signal 72 have a greater magnitude than leading undershoot 80 and trailing undershoot 82 of reshaped head signal 74. Leading undershoot 80 and trailing undershoot 82 also extend closer to primary pulse 81 than leading undershoot 76 and trailing undershoot 78 extend to primary pulse 77. Thus, the leading and trailing undershoots from the reshaped poles of the present invention have a smaller magnitude but extend further than the undershoots from prior art heads. Since it is the magnitude of the undershoots which can force reduction of lineal data density in magnetic media, the present invention allows greater lineal data density by reducing this magnitude.

Figure 5:
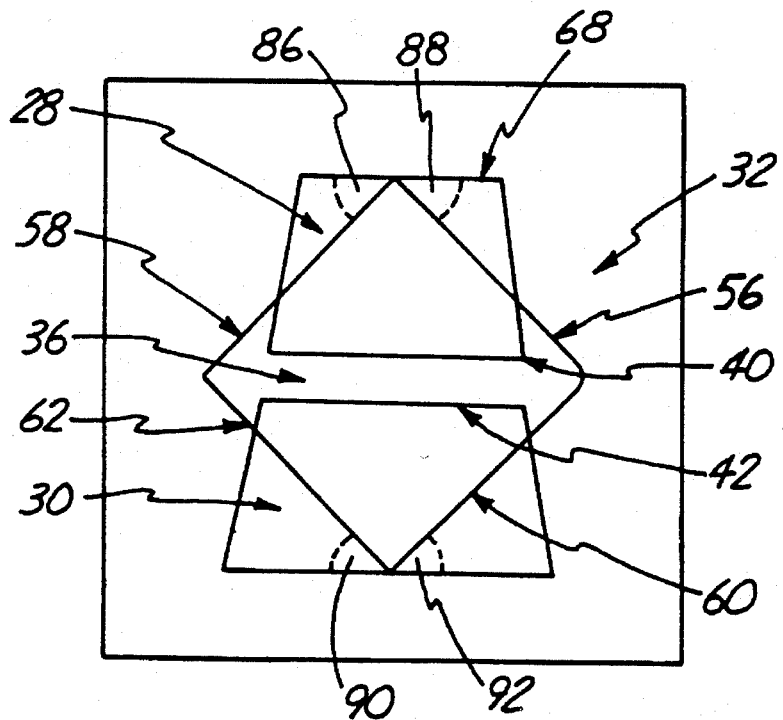
FIG. 5 is a top view of the patterned poles of FIG. 3E.

The key features of the patterned poles of the present invention are illustrated in FIG. 5 which is a top view of the patterned poles of FIG. 3E. Top tapered edges 56 and 58 form identical top taper angles 86 and 88 with depressed leading edge 68. In addition, top tapered edge 56 is the same length as top tapered edge 58 and the two edges are symmetrical about and abut at a line perpendicular to gap-defining edge 40 in the plane of the figure. The symmetry between these two edges makes the undershoot reduction produced by the tapered edges consistent for all positions of the thin-film head over the medium regardless of the skew angle of the head. Similar symmetry is found between bottom tapered edges 60 and 62. Bottom tapered edges 60 and 62 abut top tapered edges 56 and 58 at a point level with the center of gap 36. Ideally, all of the tapered edges abut at a point, however, milling unavoidably rounds the corners where these edges abut.

The only portions of the tapered edges which affect undershoot in the read signal are those which are part of top pole tip 28 or bottom pole tip 30. The remaining portions of the tapered edges are in surrounding material 32 and have no direct effect on the flux entering the pole tips. However, the portions of the tapered edges in surrounding material 32 indirectly affect the overall performance of the patterned poles. The tapered edges in surrounding material 32 are constructed so that unavoidable errors in the positioning of pole tip mask 50 during the patterning of the photoresist will not cause one of the tapered edges to cross into gap-defining edges 40 or 42. Crossing into the gap is undesirable because it reduces the gap width and thus causes unpredictable variations in the gap width. Thus, in the ideal position, the tapered edges must be far enough away from gap defining-edges 40 and 42 to ensure that in extreme position error conditions none of the tapered edges cross the gap defining edges. In the embodiment shown in FIG. 5, this positioning is achieved by adjusting the taper angles of the tapered edges so that the tapered edges in the surrounding material are sufficiently far from the gap defining edges. Specifically, taper angles 86, 88, 90, and 92 are approximately 25 to 30 degrees in this embodiment.

Figure 6:
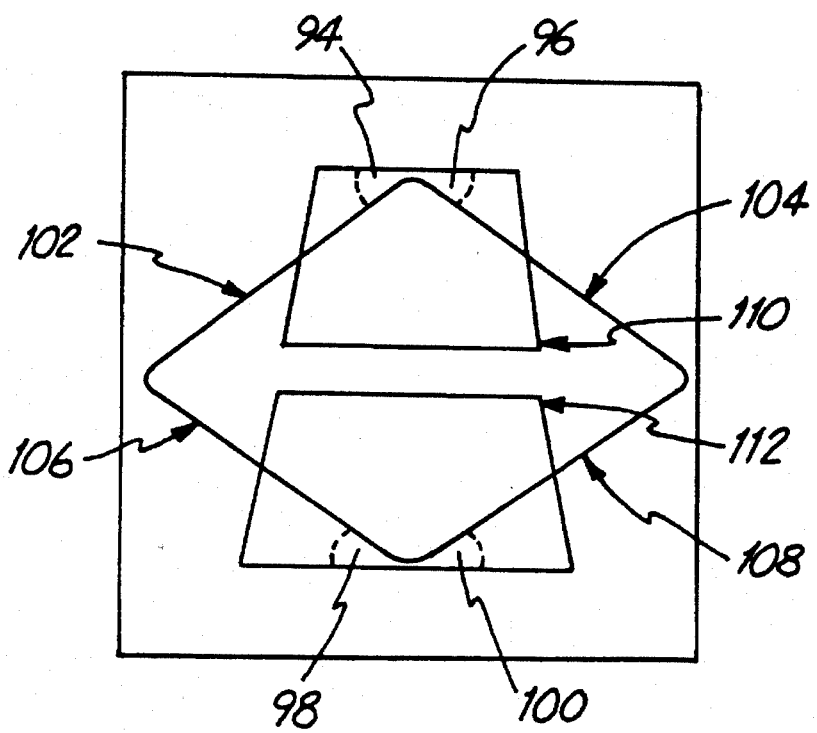
FIG. 6 is a top view of a second embodiment of the patterned poles of the present invention.

FIG. 6 shows another embodiment of the present invention which is identical to the embodiment of FIG. 5, except that taper angles 94, 96, 98, and 100 are smaller than the taper angles of FIG. 5 and thereby make the distance between tapered edges 102, 104, 106, and 108 and gap-defining edges 110 and 112 greater than those distances are in FIG. 5. Specifically, the taper angle in FIG. 6 is approximately 15 to 20 degrees where it was 25 to 30 degrees in FIG. 5. In practice, the taper angle may range between 10 and 50 degrees. By moving tapered edges 102, 104, 106 and 108 further from the gap, this embodiment remains functional even with larger mask positioning errors.

Figure 7:
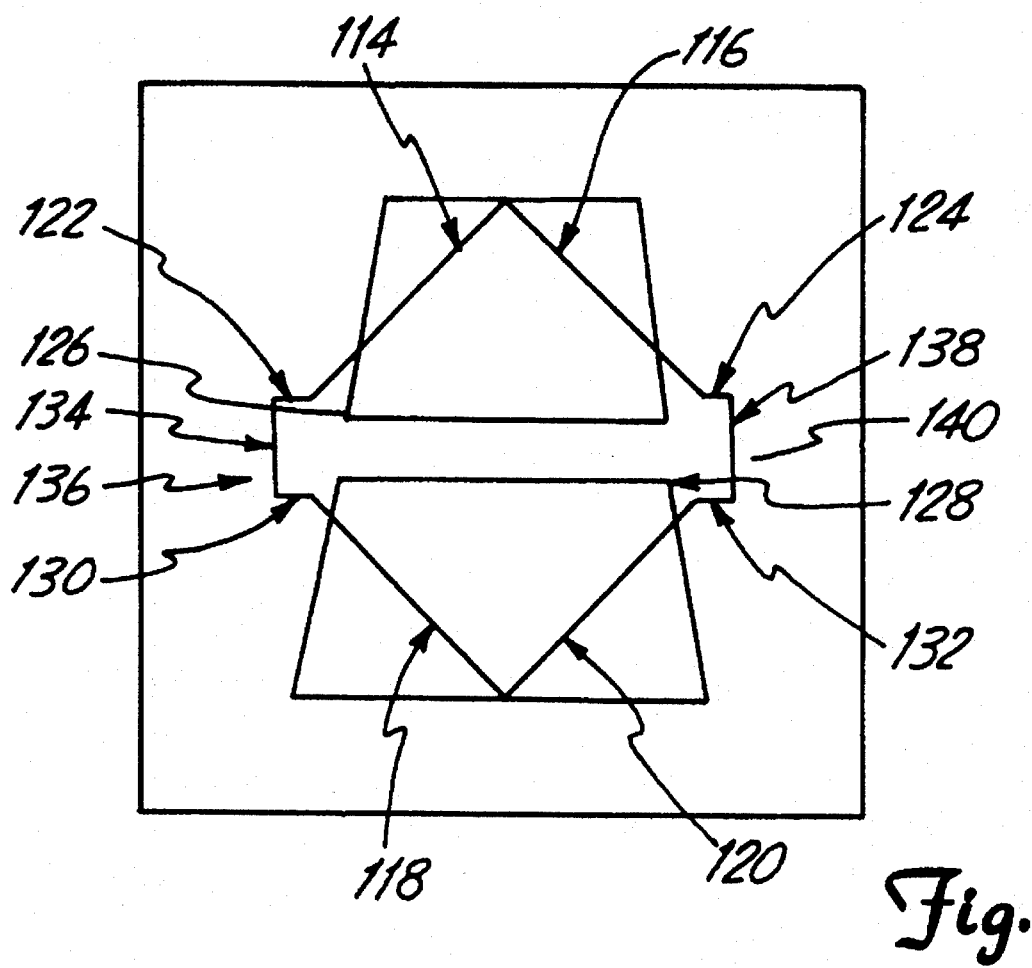
FIG. 7 is a third embodiment of the patterned poles of the present invention.

FIG. 7 shows a third embodiment of the present invention which uses a different technique to ensure that the edges of the interface surface do not cross the gap-defining edges. In this embodiment, top tapered edges 114 and 116 do not abut bottom tapered edges 118 and 120. Instead, top tapered edges 114 and 116 abut top wing edges 122 and 124 respectively and bottom tapered edges 118 and 120 abut bottom wing edges 130 and 132 respectively. Top wing edges 122 and 124 and bottom wing edges 130 and 132 are all parallel to gap defining edges 126 and 128. Top wing edge 122 also abuts end wing edge 134 which abuts bottom wing edge 130. Taken together, these three edges form wing 136. Similarly, top wing edge 124, bottom wing edge 132, and end wing edge 138 form wing 140.

The pattern shown in FIG. 7 is significant for a number of reasons. First, the tapered edges are long enough to provide tapered edges over the entire width of both pole tips. By continuing the tapered edges outside of the pole tips, this design ensures that even with pole tip mask alignment errors the tapered edges will continue to the outside limits of the pole tips. This maximizes the reduction of undershoots by ensuring that top and bottom wing edges 122, 124, 130 and 132, which are all parallel to the gap-defining edges, do not form an edge in the pole tips.

The shape is also significant because wings 136 and 140 permit a greater taper angle within the pole tips. Without wings 136 and 140, extreme mask positioning errors would cause the tapered edges to cross the gap defining edges. However, with the wings, the edges are far enough away from the gap defining edges that even with extreme mask positioning errors the edges will not cross the gap defining edges.

Lastly, the shape is significant because it is symmetrical. Top tapered edge 114 is at the same taper angle and has the same length over top pole tip 28 as top tapered edge 116. Although they do not necessarily have the same length or taper angle as the top tapered edges, bottom tapered edges 118 and 120 do share the same taper angle and length over bottom pole tip 30. Because of this symmetry, the thin-film head of FIG. 7 reduces undershoots consistently at all positions and skew angles over the medium.

Figure 8:
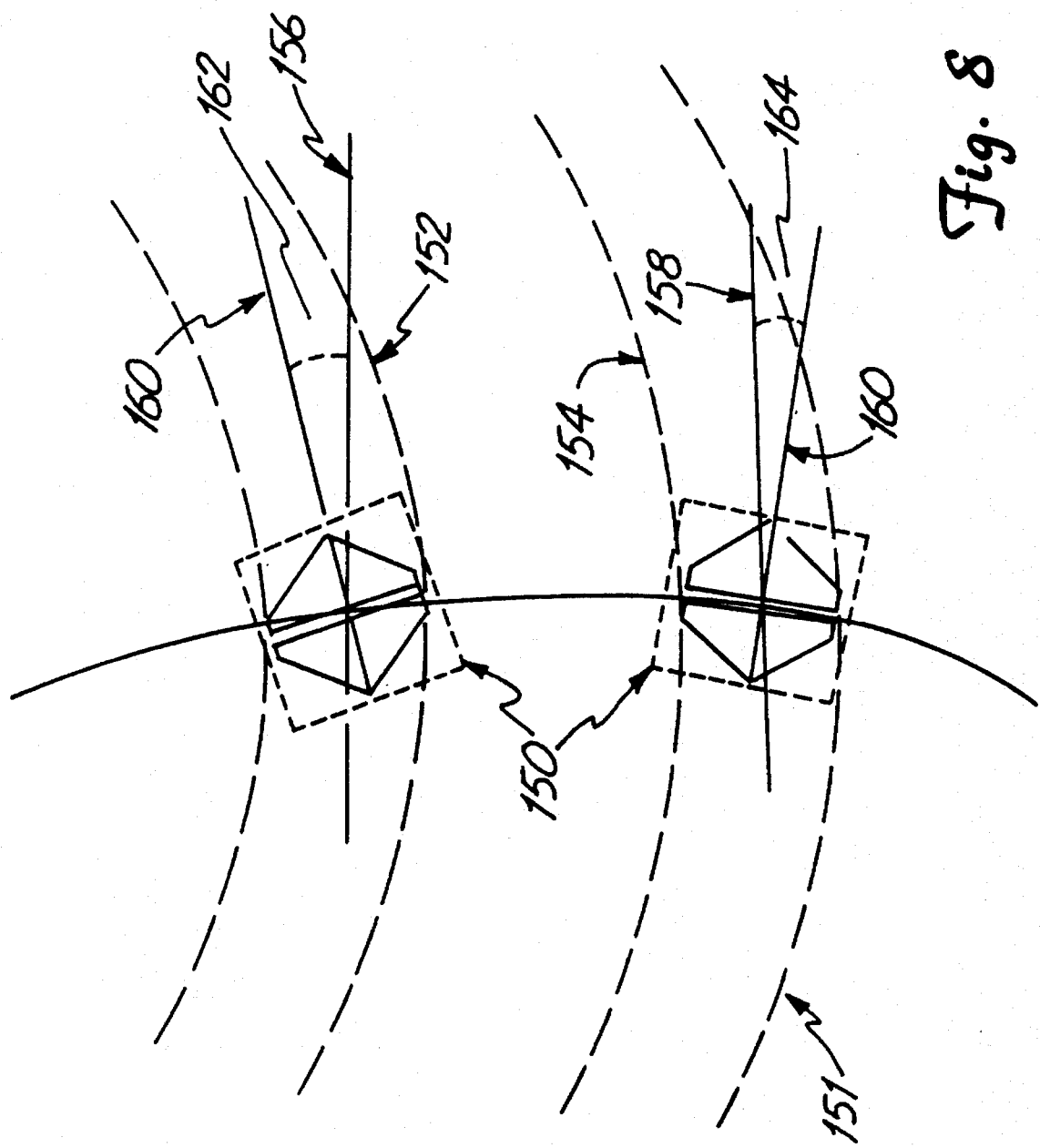
FIG. 8 is a top view of a thin-film head of the present invention positioned over a magnetic disc.

FIG. 8 shows the relationship between the reshaped pole tips of the present invention and the skew angle of thin-film head 150. Because thin-film head 150 is mounted on an arm that has a different axis than the magnetic disc 151, the head's gap is not always perpendicular to the head's direction of travel. The angle between the perpendicular to the gap and the head's direction of travel is the skew angle. In FIG. 8, thin-film head 150 has two extreme positions over the disc, one at inner track 152 and one at outer track 154. Over inner track 152, the relative movement of thin-film head 150 is in the direction of tangent 156 which is tangent to inner track 150 at its center. Likewise, thin-film head 150's direction of movement over outer track 154 is in the direction of tangent 158. Perpendicular line 160, which is perpendicular to the gap width, is not aligned with either tangent 156 or tangent 158 when head 150 is over inner track 150 or outer track 152 respectively. The angle between perpendicular line 160 and tangent 156 forms skew angle 162, and the angle between perpendicular line 160 and tangent 158 forms skew angle 164. Skew angle 162 is considered negative and has a typical value of −20 degrees. Skew angle 164 is considered positive and has a typical value of +20 degrees. As discussed above, all of the embodiments of the present invention are symmetric so that undershoot reduction is relatively constant over skew angles from −20 degrees to +20 degrees.

In all of the above embodiments of the present invention, the leading and trailing edges of the prior art pole tips are replaced by leading and trailing edges which are further from the magnetic medium and by symmetrical tapered edges which are not parallel to the pole tips' gap-defining edges nor perpendicular to the head's direction of travel. In addition, the patterns used to reshape the pole tips are such that even extreme mask positioning errors will not result in shorter width gaps. Thus, the present invention consistently reduces undershoots over the entire medium by reshaping thin-film head pole tips without reducing the width of the read gap.

In addition, although the present invention changes the shape of the pole tips and creates a depression in the interface surface, it does not degrade the electrical or mechanical performance of the thin-film head. The amplitude of the write signal and the ability to overwrite the patterns of magnetic domains on the medium are not significantly affected by the pole tip reshaping of the present invention. In addition, for heads which move over the medium on an air bearing surface, the present invention's changes to the air bearing surface do not affect take-off velocity, fly height, stiction, or dynamic friction.

Although the present invention has been described with reference to preferred embodiments, workers skilled in the art will recognize that changes may be made in form and detail without departing from the spirit and scope of the invention.

What is claimed is:

1. A thin-film head electromagnetic transducer, the transducer for producing an electric signal from magnetic fields stored on a medium, the thin-film head comprising:

a surrounding material having an interface surface;

two pole pieces defining a gap between them, each pole piece having an interface surface contiguous with the interface surface of the surrounding material, the interface surface of at least one of the pole pieces having a gap-defining linear edge defining one side of the gap, the gap-defining linear edge having a first and second end, each end in contact with the interface surface of the surrounding material, the pole piece's interface surface also having two tapered linear edges at an acute angle to the gap-defining linear edge, the two tapered linear edges symmetric about and abutting at an axis perpendicular to and intersecting the gap-defining linear edge, the pole pieces formed of a permeable material to provide a path for flux from the magnetic fields stored on the medium; and transducing means, coupled to the two pole pieces for receiving magnetic flux from the two pole pieces, the transducing means transducing such magnetic flux into the electric signal.

2. The thin-film head of claim 1 wherein the tapered linear edges do not abut the gap-defining linear edge.

3. The thin-film head of claim 2 wherein the two tapered linear edges of at least one of the pole pieces comprise a first tapered linear edge and a second linear edge each with first and second ends, the first ends of the first and second linear edges abutting each other, the second end of the first linear edge contiguous with a linear edge formed by the surrounding material.

4. The thin-film head of claim 1 wherein each pole piece has a gap-defining linear edge, the two pole pieces' gap-defining linear edges together forming two gap-defining linear edges, the two gap-defining linear edges parallel to each other and defining the two sides of the gap, each pole piece having a pair of tapered linear edges symmetric about and abutting at an axis perpendicular to and intersecting the gap-defining linear edges.

5. The thin-film head of claim 4 wherein each of the tapered linear edges of one pole are at a first acute angle to the gap-defining edges and each of the tapered linear edges of the other pole are at a second acute angle to the gap-defining edges.

6. The thin-film head of claim 5 wherein none of the tapered linear edges of either pole abuts a gap-defining edge.

7. The thin-film head of claim 5 wherein each tapered linear edge of each pole piece has an end in contact with an end of a respective wing edge in the surrounding material, each wing edge at an acute angle to the gap-defining edges, the acute angle between each wing edge and the gap-defining edge smaller than the acute angle between the respective tapered linear edge that each wing edge is in contact with and the gap-defining edge.

8. The thin-film head of claim 7 wherein a first end wing edge connects one wing edge having one end in contact with one pole piece to one wing edge having one end in contact with the other pole piece and a second end wing edge connects a second wing edge having an end in contact with one pole piece to a second wing edge having an end in contact with the other pole piece.

9. The thin-film head of claim 1 wherein a line perpendicular to and intersecting the gap-defining edge and intersecting a point where the two tapered linear edges abut each other, and a line parallel to the direction the thin-film head moves over the medium create a skew angle between them, the skew angle having different values for different positions of the thin-film head over the medium.

10. The thin-film head of claim 9 wherein the thin-film head produces undershoots in the electric signal which are insensitive to the skew angle.

11. The thin-film head of claim 1 wherein each of the two tapered linear edges of a pole piece have an end in contact with an end of a respective wing edge in the surrounding material, each wing edge at an acute angle to the gap-defining edges, each acute angle between each wing edge and each gap-defining edge smaller than the acute angle between each respective tapered linear edge and the gap-defining edge.

12. The thin-film head of claim 11 wherein the wing edges and the tapered linear edges do not intersect the gap-defining edge.

13. The thin-film head of 11 wherein the two tapered linear edges and the wing edges are produced by aligning a mask over a portion of the pole pieces and removing material not covered by the mask.

14. The thin-film head of claim 13 wherein extreme errors in aligning the mask will not cause the edges produced by removing material around the mask to intersect the gap-defining linear edge.

15. The thin-film head of claim 1 wherein the two tapered linear edges are produced by aligning a mask over a portion of the pole pieces and removing material not covered by the mask.

16. The thin-film head of claim 15 wherein extreme errors in aligning the mask will not cause the edges produced by removing material around the mask to intersect the gap-defining linear edge.

17. A thin-film head electromagnetic transducer, the transducer for producing an electric signal from magnetic fields stored on a medium, the thin-film head comprising:

a raised section having a raised interface surface coplanar to a raised interface plane, the raised interface surface having a first raised pole surface, a second raised pole surface, a gap surface between the first and second raised pole surfaces and a surrounding surface contiguous with the first raised pole surface, the first raised pole surface having a gap-defining edge contiguous with the gap surface and having ends in contact with the surrounding surface, the first raised pole surface further having two tapered edges, the two tapered edges symmetric about and intersecting a line perpendicular to the gap-defining edge in the raised interface plane;

a depressed section having a depressed interface surface coplanar to a depressed interface plane, the depressed interface plane parallel to and separated from the raised interface plane, the depressed interface surface having a first depressed pole surface, a second depressed pole surface and a depressed surrounding surface, the first depressed pole surface and first raised pole surface both part of a first pole, the second depressed pole surface and second raised pole surface both part of a second pole; and a transducing means, coupled to the first and second poles for creating an electric signal from magnetic flux flowing in the first and second poles.

* * * * *

UNITED STATES PATENT AND TRADEMARK OFFICE
CERTIFICATE OF CORRECTION

PATENT NO. : 5,615,069
DATED : MARCH 25, 1997
INVENTOR(S) : STEVEN B. SLADE, BRIAN S. ZAK, NATHAN CURLAND

It is certified that error appears in the above-indentified patent and that said Letters Patent is hereby corrected as shown below:

Col. 3, line 57, delete "water", insert --wafer--

Signed and Sealed this

Nineteenth Day of August, 1997

Attest:

BRUCE LEHMAN

*Attesting Officer*   Commissioner of Patents and Trademarks